United States Patent [19]

Loeffler et al.

[11] 4,189,339

[45] Feb. 19, 1980

[54] METHOD FOR PROVIDING SECTIONS OF WRAPPING MATERIAL HAVING A STRIP OF ADHESIVE TAPE ATTACHED TO AN END PORTION THEREOF

[75] Inventors: Romain E. Loeffler, Littleton, Colo.; Calvin P. Sorensen, Toledo, Ohio; Larry J. Weinstein, Littleton, Colo.

[73] Assignee: Johns-Manville Corporation, Denver, Colo.

[21] Appl. No.: 846,731

[22] Filed: Oct. 31, 1977

[51] Int. Cl.$^2$ .............................................. B32B 31/00

[52] U.S. Cl. .................................... 156/263; 156/265; 156/519

[58] Field of Search ............... 156/552, 519, 522, 263, 156/264, 265, 303.2, 285

[56] References Cited

U.S. PATENT DOCUMENTS

| | | | |
|---|---|---|---|
| 2,597,885 | 5/1952 | Marks | 156/264 |
| 3,772,120 | 11/1973 | Radzins | 156/264 |
| 3,859,156 | 1/1975 | Yazawa et al. | 156/519 |
| 3,909,330 | 9/1975 | Schmermund | 156/285 |
| 4,052,242 | 10/1977 | Yazawa et al. | 156/265 |

*Primary Examiner*—Douglas J. Drummond
*Attorney, Agent, or Firm*—Robert M. Krone; Joseph J. Kelly; William C. Anderson

[57] ABSTRACT

A web of jacketing material is unwound from a reservoir thereof and conveyed at constant speed. A double sided, pressure-sensitive adhesive strip, having one side protected by a removable sheet covering, conveyed in a direction normal to that of the jacketing material, is cut to predetermined lengths, positioned subjacent to and then applied across the width of the jacketing material at predetermined intervals. The jacketing material is sheared into sections by making cuts across the material along the middle of the adhesive strip and at a line midway between adhesive strips.

8 Claims, 6 Drawing Figures

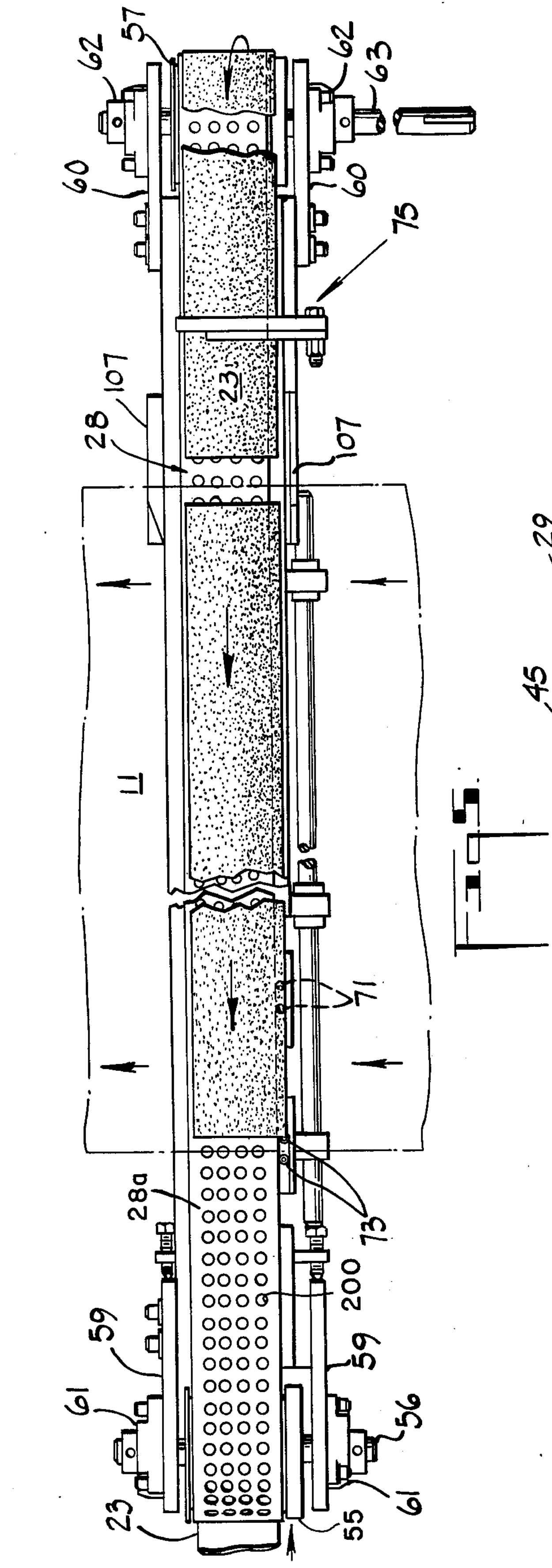
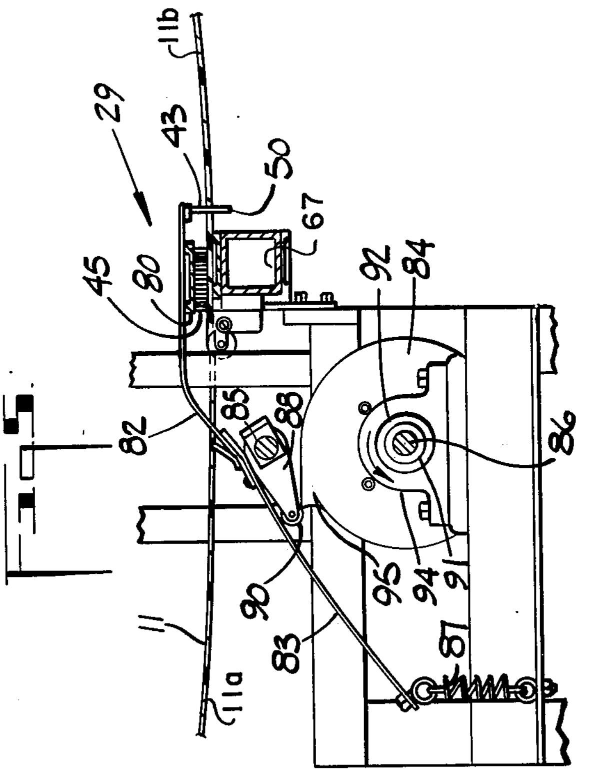

METHOD FOR PROVIDING SECTIONS OF WRAPPING MATERIAL HAVING A STRIP OF ADHESIVE TAPE ATTACHED TO AN END PORTION THEREOF

BACKGROUND OF THE INVENTION

The present invention relates generally to pipe insulation coverings and more particularly is directed to a new and improved method and apparatus for cutting, positioning, and adhering sections of pressure sensitive sealing tape of predetermined length across the width of a web of jacketing material moving at a constant speed, at predetermined intervals. Sections of pipe insulation jackets are then produced when the composite is cut across its width at the mid-lines of tape sections and at the positions midway between succeeding tape sections.

A section of jacketed pipe insulation is formed by adhering precut sheet material to a major portion of the outer surface of a tube of fibrous thermal insulation. The jacketed tube has a region of jacketing which is not adhered to the tube to expose a sector of the tube wall which is slit longitudinally to afford a means of slipping the tube over a pipe. Adjacent the exposed sector, extending tangentially thereof, is a tab extension of the jacket to which is adhered a strip of sealing tape. After removal of a protective tear strip (in the field), exposing a pressure sensitive surface of the tape, the pipe insulation may be quickly sealed by adhering the tab to the remainder of the wrapper.

Problems arise in the production of sections of jacketing material and attached adhesive edge strip. One known method, a semi-automatic operation, is characterized by manual feeding of precut jacket sections into a tape application unit. The production rate of such an operation is typically low. Fully automatic tape application machines, such as disclosed in U.S. Pat. No. 3,658,614, have production rates which are limited by the cyclical or intermittent nature of the feed of jacketing material.

SUMMARY OF THE INVENTION

According to the invention, sheet material for jacketing is continuously advanced from a source thereof, and a length of double sided pressure sensitive adhesive tape, having one side covered with a removable sheet material, is held to a moving conveyor surface by suction, conveyed in a direction normal to the motion of the jacketing material, cut to a predetermined length (slightly less than the width of the jacketing material) and advanced to a position parallel to and proximate a first or lower surface of the jacketing material with the adhesive side of the tape facing the jacketing material. A transversely extending compression pad, in a rapid motion, engages a second or upper surface of the jacketing material and cooperates with the new stationary conveyor surface to compress the tape and the adjacent portion of jacketing material thereby causing adhesion of the tape to the jacket (during the dwell of the compression pad upon the jacketing material there is sliding of the compression pad surface upon the second surface of the moving jacketing material); in a rapid succeeding motion the compression pad disengages from the rapidly moving jacketing material and a transversely extending bar slidably engages the first surface of the continuously advancing jacketing material and moves upwardly, concomitantly breaking a vacuum hold which, at that point in time, is generally effective upon the first surface of the jacketing material via the side of the adhesive tape covered with the removable sheet material. The taped jacketing material is then conveyed through cutting means whose action is mechanically synchronized with the tape applying action, and is effective to shear through the taped jacketing material at a line across the middle of a section of tape and at another line midway between a first piece of tape and a following piece of tape. This results in sections of jacketing that ultimately face in opposite directions. These sections are advanced to means for automatically sorting them into two stacks of like-facing jackets.

One of the objectives of the invention is to provide a method and apparatus for producing pipe insulation jackets having adhesive sealing strips and employing a continuous feed of jacketing material from a spool source thereof, eliminating the necessity of applying adhesive tape to precut sections of jacketing material.

Another object of the invention is to produce a variety of sizes of pipe insulation jackets utilizing a single spool of jacketing material.

A further object of the invention is to produce pipe insulation jackets by an apparatus and method that insures good registration of adhesive tape edge and jacket leading edge.

A still further object of the invention is to provide a method and apparatus for producing pipe insulation jackets at a greater production rate than has been practical heretofore.

DESCRIPTION OF THE DRAWINGS

FIG. 5 is a sectional view with parts broken away taken along the line 5—5 of FIG. 2.

FIG. 6 is a view similar to FIG. 4 but showing the cam follower in its raised position.

DESCRIPTION OF THE PREFERRED EMBODIMENTS

Figure 1:
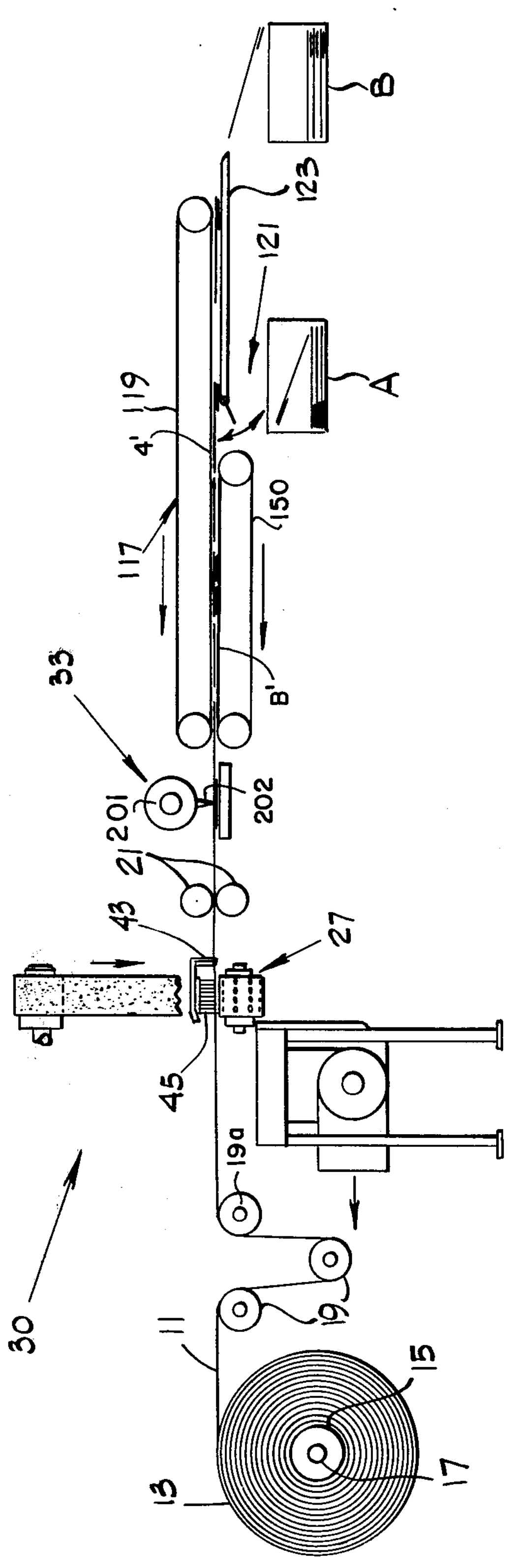
FIG. 1 is schematic illustration of a side elevation of an apparatus constructed according to the present invention.

To accomplish the objectives of this invention there is provided, as shown in FIG. 1, a source of jacketing material 11 in the form of a roll 13 of jacketing material wound on a spool 15 which is supported for easy reloading by a mandrel 17 passing through the core of spool 15 and being supported by suitable means, not shown. Jacketing material 11 is fed off the roll 13 and around rolls 19 and 19(*a*) which are suitably mounted for free rotation and which help guide the flow of the advancing jacketing material 11. The jacketing material 11 is advanced through a tape application station 30 and grasped in the nip of pull rolls 21 that are suitably mounted and driven in counter rotation to move the jacketing material to the right as viewed in FIG. 1 at a predetermined constant speed. The jacketing material used is a $35\frac{1}{2}''$ wide laminate of paper, glass fiber scrim and metal foil backing.

Figure 2:
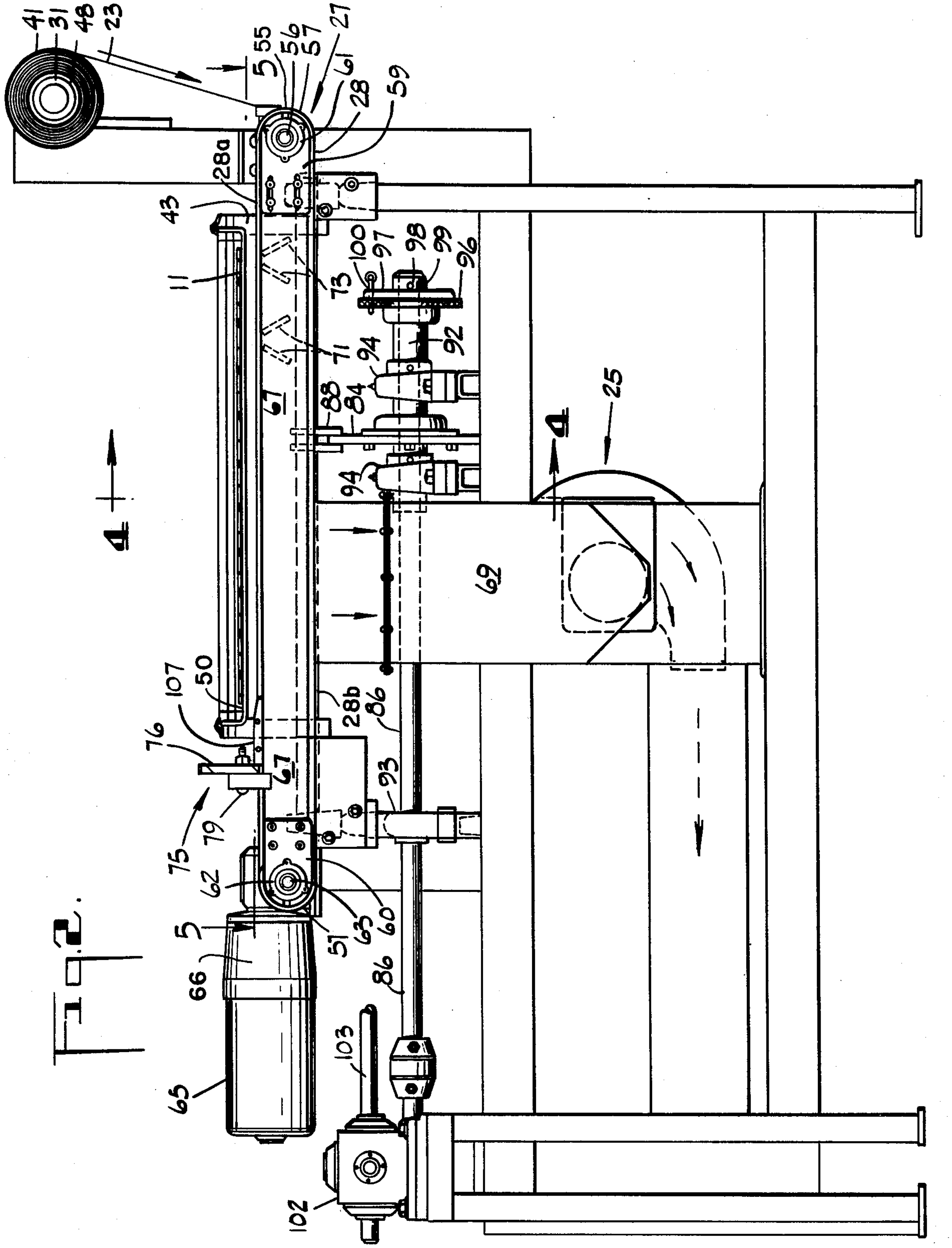
FIG. 2 is a right-hand end view, looking towards the upstream direction of the apparatus, showing the tape applying feature of the apparatus illustrated in FIG. 1.
Figure 3:
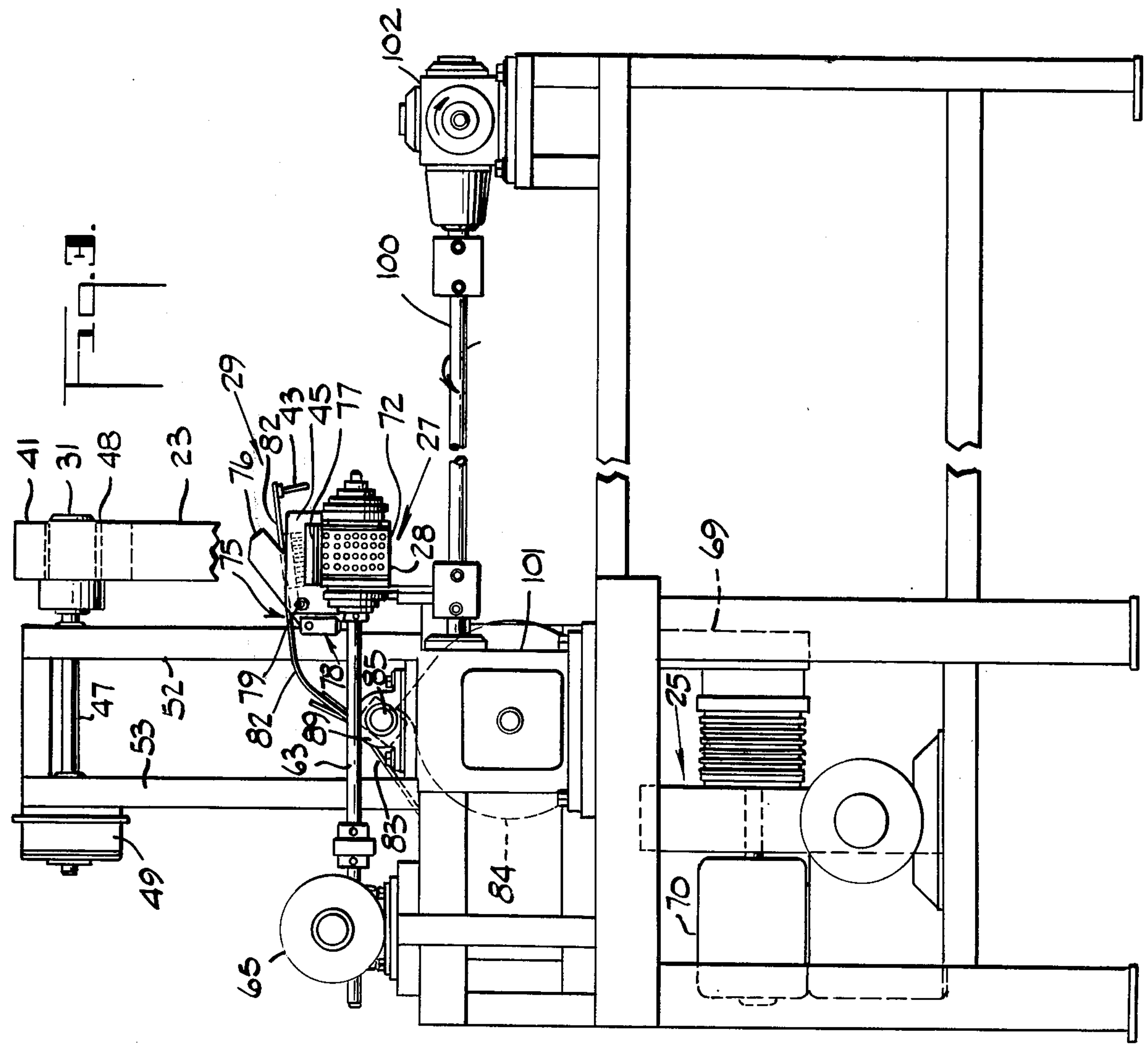
FIG. 3 is a view in side elevation of the apparatus shown in FIG. 2, with parts broken away.

At the tape application station 30, of which details are best shown in FIGS. 2 and 3, a roll 41 of double width pressure sensitive adhesive tape 23, having one of its adhesive covered surfaces exposed and the other covered with a removable sheet material, is carried on a spool 48 that fits over a mandrel 31. The spool 48 is mounted over the mandrel 31 in such a manner that torque may be transferred from roll 41 to mandrel 31 without significant slippage between the spool 48 and the surface of the mandrel 31. In order to facilitate easy loading and unloading, a suitable expansible mandrel of known design may be used. Mandrel 31 is attached to a shaft 47 for rotation therewith, the shaft 47 being supported for rotation by suitable journal bearings (not shown) that are mounted upon support members 52 and 53. An end portion of the shaft 47 is rotatably mounted within a brake assembly 49 which is attached to support member 53.

The tape utilized by the invention is 3" wide and is adhesive coated on both of its faces, one face being covered with a 3½" wide removable tear strip that overlaps each edge of the adhesive by ¼". As shown in FIG. 2, the roll 41 of adhesive tape is disposed above and to the right of the right end of a tape conveyor 27. Conveyor 27 comprises a continuous foraminous conveyor belt 28 which circulates in a clockwise direction around a free-wheeling pulley 55 mounted on a shaft 56 which has ends journaled for rotation in flange bearings 61 of the pulley support brackets 59, and driving pulley 57 which is supported and rotated by a shaft 63 which is mounted in bearings 62 of pulley support brackets 60 which are fastened to a conveyor vacuum housing 67. An extension of the shaft 63 is coupled to the output end of motor reducer 66 which is energized by an electric motor 65. The conveyor vacuum housing 67 is an elongated metalic box which occupies most of the space between conveyor pulleys 55 and 57 and the top and bottom stretches of the conveyor belt 28. The top and bottom walls of the conveyor vacuum housing 67 have a longitudinally extending series of milled slots, not shown. A portion of the rear wall of the conveyor vacuum housing 67 has an opening which communicates with a suction duct 69 which is in turn connected to the inlet of an exhaust blower 25 powered by an exhaust blower motor 70. The entire surface of the conveyor belt 28 is marked by an array of drilled holes 200, as shown in FIG. 3. By the above-described means the suction generated by the exhaust blower 25 is effective over a large portion of the conveyor top 28(*a*) and bottom 28(*b*).

The advancing and stopping of the conveyor belt 28 by means of motor 65 and the activation of the tape roll brake 49 is controlled by two pairs of photoeyes, i.e., cut photoeyes 71 and position photoeyes 73, shown in FIGS. 2 and 3, which are adjustably mounted in a suitable manner to the rear side of the conveyor vacuum housing 67. Tape 23, as required by the machine, is unrolled from the roll 41, and laced around and under the right end of the conveyor 27, as viewed in FIG. 2, so that the non-tacky, covered side of the tape 23 is held unto the conveyor belt 28 by suction force. The conveyor belt carries the tape 23 across the bottom 28(*b*) of the conveyor, around the drive pulley 57 and to the top 28(*a*) of the conveyor where the lead of the tape 23 leaves the conveyor belt to move through a tape cutter 75 and thereafter returns to the conveyor belt at a point just beyond the cutter 75. The alignment of the adhesive tape 23 upon the conveyor belt 28 is such that it overhangs the rear edge 28(*c*) of the conveyor belt 28 by approximately ½" as is illustrated most clearly in FIG. 5. This overlapping portion of the tape 23 provides a sighting surface for the operation of the photoeyes 71 and 73. Each pair of photoeyes comprises a light beam source and a light sensor that are aligned with respect to one another so that light emitted from the light source may be reflected off the undersurface of the overhanging portion of tape 23 and received by the light sensor. In this manner the presence of material only at points above the photoeyes through which tape 23 passes is detected. Thus the operation of the photoeyes control is unaffected by the presence of jacketing material 11 approximately 1" above the tape.

Tape cutter 35 has a cutter blade 76 which is pivotally mounted at 79 so that when an air cylinder apparatus 78 is activated by a signal from cut photoeyes 71, the cutter blade 76 sweeps downwardly to cooperate with an anvil 77 in a scissor-like cutting motion.

Figure 4:
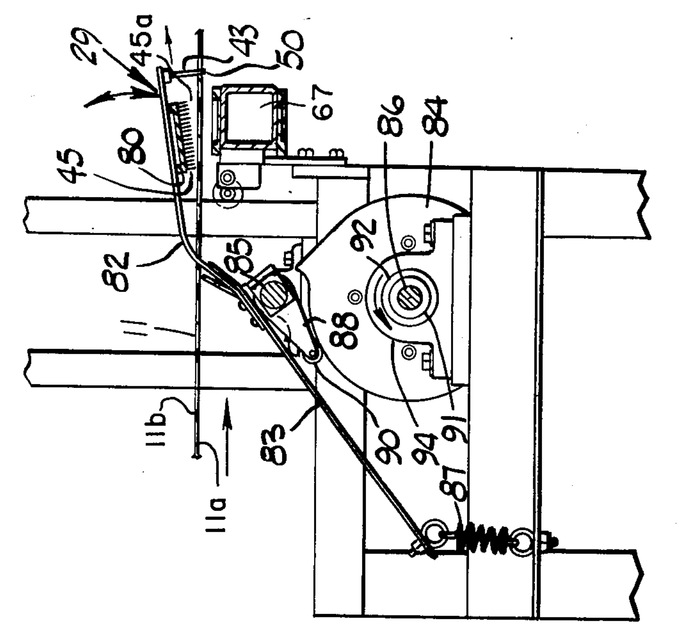
FIG. 4 is a sectional view taken along the line 4—4 of FIG. 2.

As is best shown in FIG. 4, disposed above the conveyor 27 is bumper head 29 featuring a bumper pad 45 whose jacketing contacting surface 45(*a*) matches the width of the conveyor and extends completely across the jacketing material 11. A bumper pad 45, composed of "Astro-Turf", has been successfully employed. The pad 45 is bonded to an aluminum pad plate 80 which is secured to a pair of spaced apart spring steel bumper arms 82. At the leading edge of the bumper arms 82 is attached a release bar 43 which, as shown in FIG. 2, forms a rectangular loop having a lower transversely extending portion 50 whose upper surface may slidably engage the undersurface 11(*a*) of a moving web of jacketing material 11. As shown in FIG. 4 the bumper arms 82 are fastened to cam follower shaft 85 which is rotatably mounted by bearings 89 (see FIG. 3) on the frame of the machine. Cam follower arms 88, holding cam follower 90, are fixedly mounted upon a shaft 85. Spring steel bumper arm extensions 83 have lower extremities fastened to the machine frame by way of springs 87. The springs 87, which are in tension, act through the arms 83 to induce a counter-clockwise force about the axis of shaft 85 in order to maintain the cam follower 90 in slidable engagement with the working surface of the high rise, fast action cam 84.

As best can be seen in FIG. 2, the cam 84 is attached to a hollow cam shaft 92 which is supported for rotation in bearings 94 mounted on the machine frame. A right end portion of the cam drive shaft 86 extends co-axially through the hollow cam shaft 92 and is supported within the bearings 94 by bushings 91 as shown in FIGS. 4 and 6. A left hand end portion of the shaft 86 is rotatably mounted in bearings 93 to the machine frame. The rightward extension of hollow shaft 92 comprises a first phasing disc 96 having a first circular array of 27 holes drilled therethrough. Abutting the first phasing disc 96 is a second phasing disc 97 having 26 drilled holes in a second circular array whose radius is equal to the radius of the first array of holes. The end of shaft 86 fits through the bore of the hub 99 of the second phasing disc 97 and is fastened thereto by use of a roll pin 98. The two phasing discs are joined in torque-transmitting relationship when a detent pin 100 is fitted through a pair of aligned holes in the discs.

In the operation of the apparatus according to the invention, the jacketing material 11 is led off the supply roll 13, taken over the guide rolls 19 and 19(*a*), and fed through the taping station 30 and into the nip of pull rolls 21 where the material 11 is grasped and advanced at a steady speed. As shown in FIG. 1 jacketing, material 11 moving, between the guide roll 19(*a*) and the pull rolls 21 is, held in a generally horizontal path that passes, as seen in FIG. 4, between the top of the conveyor 27 and the bottom 48(*a*) of bumper pad 45 and through the rectangular opening bounded by the release bar 43.

When the position photoeye 73 senses the absence of tape 23, the conveyor belt 28 is put into motion and the roll brake 49 is released. Thus, tape 23 moves to the left, as shown in FIG. 2, across the bottom 28(*b*) of the conveyor, around the pulley 57 and to the right along the top 28(*a*) of the conveyor. The tape passes between the cutter blade 76 and anvil 77 of the tape cutter 75 and continues until tape 23 is sensed by cut photoeyes 71 which stop the motion of conveyor belt 28 and activate the brake 49 which prevents continued unreeling of the tape roll 41 due to inertia. Cut photoeye 71 also activate the tape cutter 75 which cuts the tape to the desired length, which is generally ¼" shorter than the width of the jacketing material 11. After completion of the cutting cycle, the motion of belt 28 is restarted and brake 49 released. As can be seen in FIG. 5 slippage occurring between the conveyor belt 28 and the tape 23 when the conveyor belt 28 is restarted generally creates a gap of as much as ½" between a freshly cut section of tape and the leading edge 23(*a*) of the remainder of tape 23. The tape is advanced until it is sensed by the position photoeyes 73 which stop the motion of the belt 28 and activates brake 49. The position photoeyes 73 are adjusted so that a cut length of adhesive tape 23 is thus positioned directly below the moving sheet of jacketing material 11, the edges of which overlap the ends of the tape section by ⅛". FIG. 5 shows the relative position of materials at this point.

When lobe 95 of the high rise, fast action cam 84, which rotates in a counter-clockwise direction as viewed in FIG. 6 engages, the cam follower 90, the cam follower arms 88 and cam follower shaft 85 are caused to pivot in a clockwise direction. This causes the bumper arms 82 to rotate, thus driving in a downward direction the bumper assembly 29, causing the bumper pad 45 to strike the top of the jacketing material 11 to bring the bottom surface 11(*a*) of the jacketing material 11 into compressive contact with the tacky surface of the positioned strip of adhesive tape 23. The strip of tape is then instantly joined to the moving jacketing material 11. The conveyor vacuum force, although effective in preventing movement of the strip of tape 23 upwardly off the conveyor, does permit sliding motion of tape 23 relative to the conveyor belt top 28(*a*) in the direction of motion of the jacketing material, thus allowing the adhered strip of tape to immediately advance with the moving jacketing material. Bumper pad 45 hits the jacket material 11 before the cam follower 88 reaches the top of the cam lobe 95 and the additional turning motion of the cam follower shaft 85 is absorbed by the spring steel bumper arms 82 and the bumper pad 45. During this time the bumper pad 45 is in sliding contact with the top surface 11(*b*) of the moving jacketing material 11.

Because of spacers 107 which project vertically above the conveyor belt surface as shown in FIG. 2, the leading edge 23(*a*) of the main body of tape 23 will not come into contact with jacketing material 11 when the bumper 29 is in its engaging position as shown in FIG. 6.

As the high rise cam 84 continues to turn in an anticlockwise direction beyond the rotational position shown in FIG. 6, the pad 45 disengages the upper surface of jacketing material 11. At this point there is a tendency for the advancing jacketing material 11 to be held down upon the conveyor top by the vacuum force existing there. This vacuum hold is broken by the upwardly moving release bar 43 which contacts the lower surface 11(*a*) of the jacketing material 11 pulling it off the conveyor surface.

When position photoeyes 73 detect the removal of material from the conveyor surface, conveyor motion is restarted and the tape applying cycle is repeated.

The cam 84, pull rolls 21 and cutting apparatus 33 (shown in FIG. 1) are powered by the same source (not shown). The cam 84 is coupled to the power source and the cutting apparatus 33 by way of cam shaft 92 phasing discs 96, 97, drive shafts 86, 100 and 103 and right angle gear boxes 101 and 102 shown in FIG. 3. This coupling arrangement allows the cutting apparatus 33 to effectively shear through the taped jacketing material at a line across the middle of a section of tape and at another line midway between a first piece of tape and a following piece of tape, as can be seen from FIG. 1. As can also be seen from FIG. 1, cutting apparatus 33 comprises a rotary drum 201 having a cutting blade 202 disposed radially outward therefrom.

Although the preferred embodiment of the invention utilizes a cam to activate the bumper mechanism, this action being mechanically synchronized with the cutting action of the cutting apparatus 33, the invention may also be practiced by using an air cylinder of conventional design to operate the bumper mechanism, the air cylinder in this alternative embodiment being synchronized with the cutting apparatus 33 by electrical means.

As can be readily seen from FIG. 1, once the cutting apparatus 33 shears through the middle of a section of tape and at another line midway between a first piece of tape and a following piece of tape, sections of jacketing have adhesive strips ultimately facing in opposite directions. These sections are advanced to means 117 for automatically sorting them into two stacks of like-facing jackets.

Means 117 comprises an upper, counterclockwise moving conveying means 119, lower, clockwise moving, conveying means 150, pivoting means 121 and stationary means 123 for cooperating with conveying means 119 for conveying one of the two jacketing sections through a stacking station. In use, sections of jacketing A', B', moving downstream from cutting apparatus 33, face in opposite directions, as explained, supra. Conveying means 119, 150 cooperate to move sections A', B' to pivoting means 121 which operates in such a manner to allow all sections A' to fall into a stack A and all sections B' to be moved along by conveying means 119 and stationary means 123 and placed in a stack B. Any conventional means may be used so that pivoting means 121 moves at an appropriate time to allow section A' to fall into stack A and let sections B' move into operative contact with conveying means 119 and stationary means 123.

In order to ensure that the jacketing material is consistently cut into sections of the desired jacket length, suitable gearing means (not shown) maintains the speed of the pull rolls 21 at a constant relationship to the speed of the cutting apparatus 33. This gearing means includes a gear changing feature such that when it is desirable to produce jackets of a different length, i.e. jackets for pipe insulation of a different diameter, a new ratio of pull roll speed to shearing speed can be readily selected. The speed and accuracy attainable by Applicant's invention is such that sections of tape may be adhered to within $\frac{5}{8}$" of a predetermined point upon jacketing material moving at 288 feet per minute.

Whenever a new jacket length is to be produced the striking motion of bumper assembly 29, and thus the placement of the tape upon the jacketing material 11 must be synchronized with the cutting action of the cutting apparatus 33. This is done by means of the phasing discs 96 and 97 shown in FIG. 2. Since one disc has 27 holes and the other 27 holes, 702 combinations are provided, and for each 0.513 degree relative turn of the discs an alignment of a disc 96 hole and a disc 97 hole is achieved. Thus by inserting pin 100 through the desired set of holes in the two phasing discs the tape applying action of the bumper mechanism 29 is advanced or retarded relative to the laying of cuts by the shearing mechanism 33. Using the proper hole combination the tape 23 is positioned on the jacketing material 11 so that the tape sections will be cut through its center by the shearing apparatus 33.

It is to be appreciated that the various details of the method and apparatus of this invention lend themselves to modification, alternatives, and variations. Accordingly, it is to be understood that the above disclosure is to be read as illustrative of the present invention and not in a limiting sense.

What is claimed is:

1. A method for adhering to sections of a first sheet material a length of a second sheet material having an edge that registers with an edge of an end portion of each of said sections, comprising the steps of:

(a) constantly advancing a continuous length of first sheet material in a first direction;

(b) periodically advancing a continuous length of a second sheet material transverse to said first direction and proximate to said first sheet material, said second sheet material having a first and second adhesive surface, said first adhesive surface being exposed and said second adhesive surface being covered by a removable strip of material;

(c) severing said second sheet material into strips having a length slightly less than the width of said first sheet material by periodically cutting across the path of advance of said second sheet material;

(d) periodically and in succession, advancing, positioning and holding stationary a strip of second sheet material transverse to said first direction with the exposed adhesive surface of said strip positioned opposite a surface of said constantly advancing first sheet material;

(e) in rapid succession, compressing together said positioned strip and said first sheet material in order to form a composite of materials which is temporarily held due to the continuing hold on said strip, releasing the compression and releasing the temporary hold upon said composite of materials, and (f) severing said composite of materials through the middle of said strip and midway between a first adhered strip and a succeeding one.

2. The method of claim 1, wherein said second sheet material is advanced by being held on a conveyor belt surface by suction force and said strip is advanced and positioned by said conveyor belt surface.

3. The method of claim 2, wherein the adherence of said first sheet material to said strip of second material is accomplished by compressing said first sheet material and said strip of second sheet material between said conveyor belt surface and a resilient pad, said resilient pad slidably contacting a surface of said first sheet material thereby delivering the compressive force.

4. The method of claim 1, further comprising the step of sorting the severed composite of materials into batches having like-facing strips of second sheet material.

5. The method of claim 2, further comprising the step of maintaining the plane of said first sheet material out of contact with the plane of the leading edge of said second sheet material during said compression step.

6. The method of claim 5, wherein said first sheet material and said leading edge are kept out of contact by spacers which project vertically above said conveyor belt surface.

7. The method of claim 1, wherein said step of severing said second sheet material into strips is accomplished by utilizing signals from a first pair of photoeyes in order to control a cutter which is disposed across the advance of said second sheet material.

8. The method of claim 3, wherein step (d) is accomplished by utilizing signals from a second pair of photoeyes which control the motion of said conveyor belt surface.

* * * * *

UNITED STATES PATENT AND TRADEMARK OFFICE
CERTIFICATE OF CORRECTION

PATENT NO. : 4,189,339

DATED : 2/19/80

INVENTOR(S) : LOEFFLER ET AL

It is certified that error appears in the above—identified patent and that said Letters Patent is hereby corrected as shown below:

In FIG. 1 of the Drawings, "4'" should be --A'--.

Column 1, Line 55, "new" should be --now--.

Column 3, Line 22, insert after "end", --portion--.

Column 3, Line 59, "unto" should be --on--.

Column 5, Line 16, "photoeye" should be --photoeyes--.

Column 7, Line 2, "5/8"" should be --1/8"--.

Column 7, between Lines 21 and 22, insert the following two paragraphs:

--As can be readily seen from FIG. 1, once the cutting apparatus 33 shears through the middle of a section of tape and at another line midway between a first piece of tape and a following piece of tape, sections of jacketing have adhesive strips ultimately facing in opposite directions. These sections are advanced to means 117 for automatically sorting them into

UNITED STATES PATENT AND TRADEMARK OFFICE
CERTIFICATE OF CORRECTION

PATENT NO. : 4,189,339

DATED : 2/19/80

INVENTOR(S) : LOEFFLER ET AL

It is certified that error appears in the above—identified patent and that said Letters Patent is hereby corrected as shown below:

two stacks of like-facing jackets.

Means 117 comprises an upper, counterclockwise moving conveying means 119, lower, clockwise moving, conveying means 150, pivoting means 121 and stationary means 123 for cooperating with conveying means 119 for conveying one of the two jacketing sections through a stacking station. In use, sections of jacketing A'. B', moving downstream from cutting apparatus 33, face in opposite directions, as explained, supra. Conveying means 119, 150 cooperate to move sections A', B' to pivoting means 121 which operates in such a manner to allow all sections A' to fall into a stack A and all Sections B' to be moved along by conveying means 119 and stationary means 123 and placed in a stack B. Any conventional means may be used so that pivoting means 121 moves at an appropriate time to allow section A' to fall into stack A and let sections B' move into operative contact with conveying means 119 and stationary means 123.--

Signed and Sealed this

*Twenty-third* Day of *September 1980*

[SEAL]

*Attest:*

SIDNEY A. DIAMOND

*Attesting Officer* *Commissioner of Patents and Trademarks*